J. R. GAMMETER.
APPARATUS FOR VULCANIZING RUBBER.
APPLICATION FILED MAY 20, 1907.
906,215.
Patented Dec. 8, 1908.
2 SHEETS—SHEET 1.
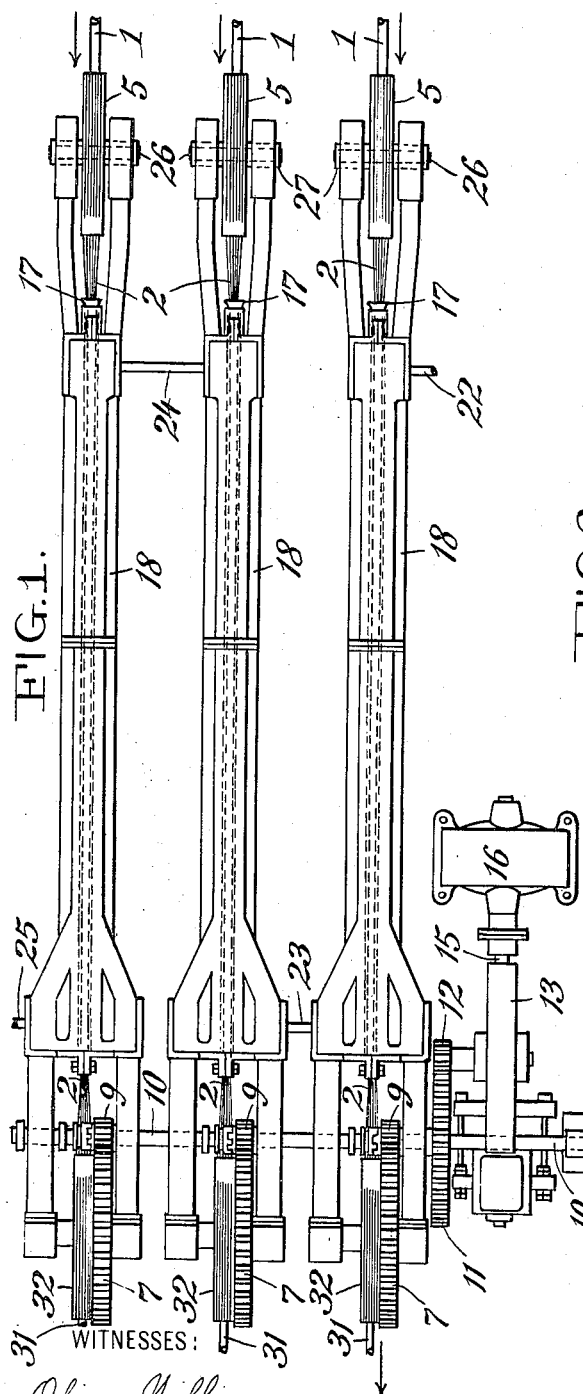
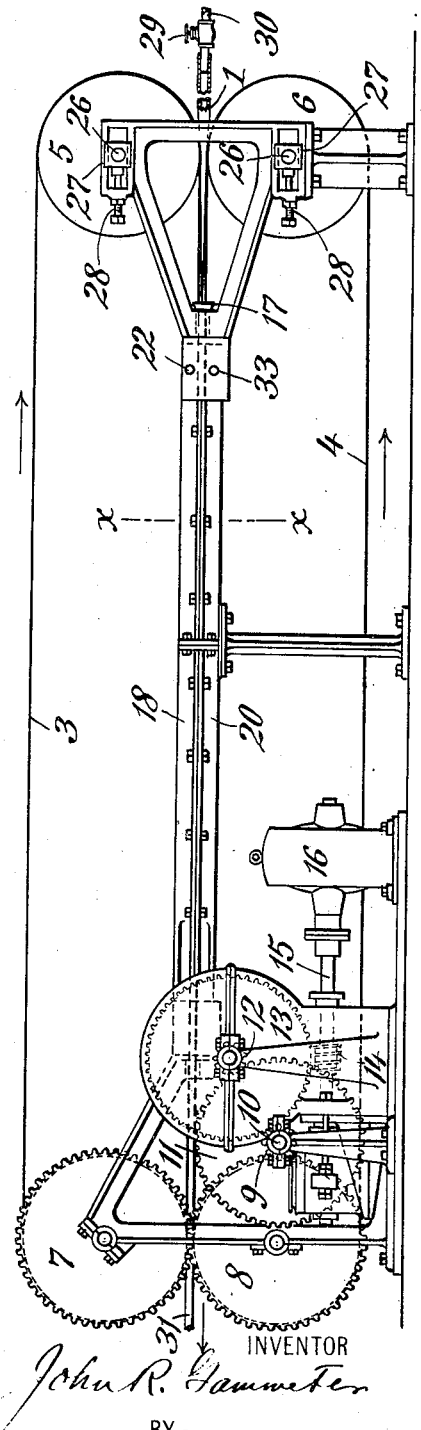

J. R. GAMMETER.
APPARATUS FOR VULCANIZING RUBBER.
APPLICATION FILED MAY 20, 1907.
906,215.
Patented Dec. 8, 1908.
2 SHEETS—SHEET 2.
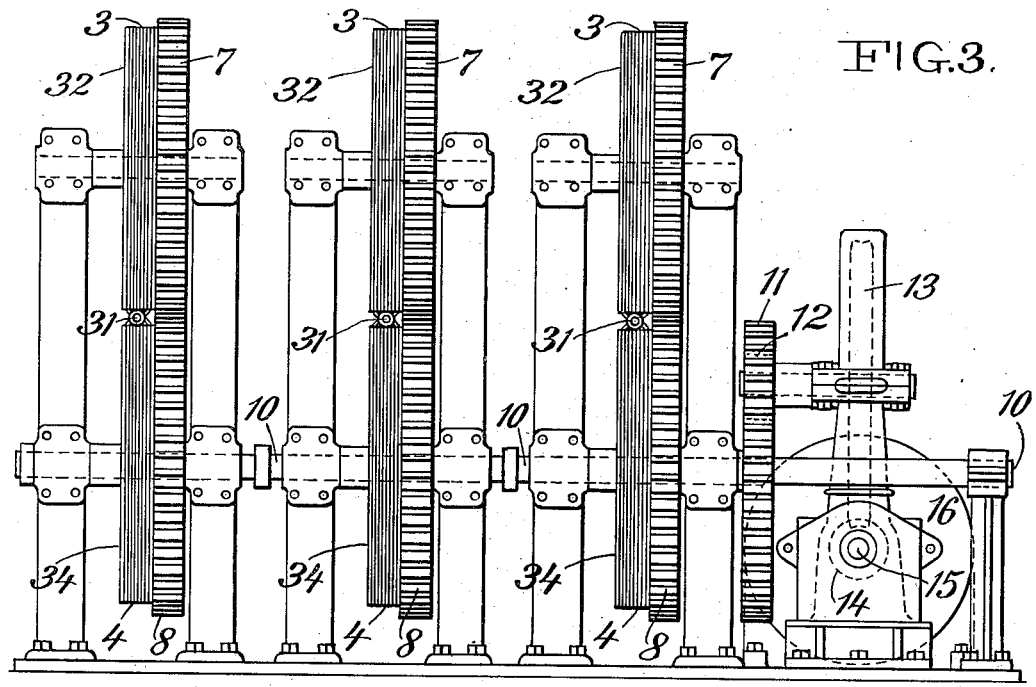
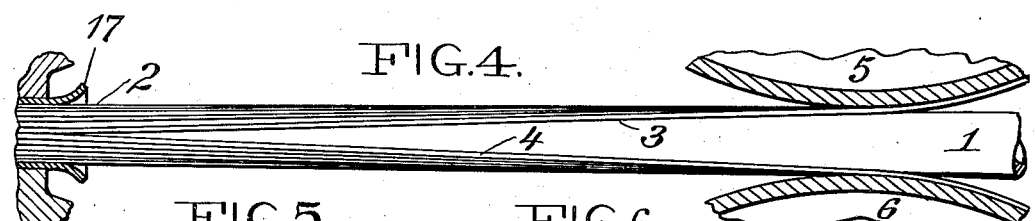
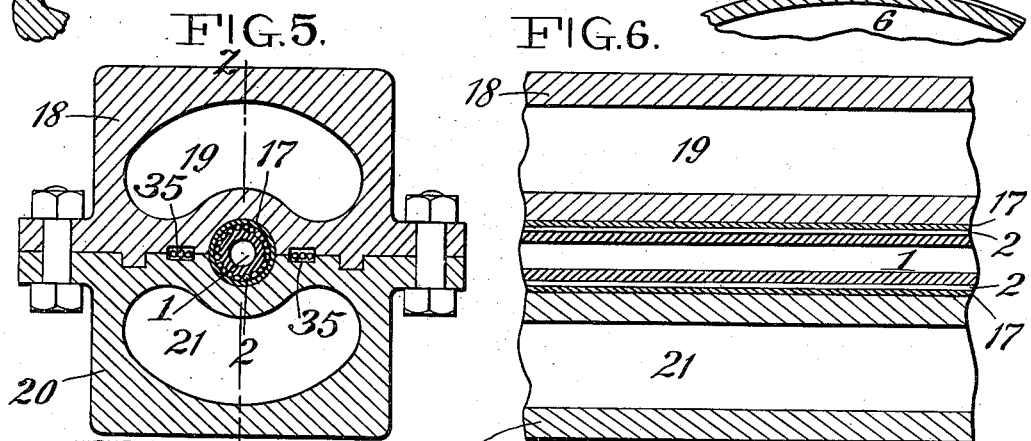
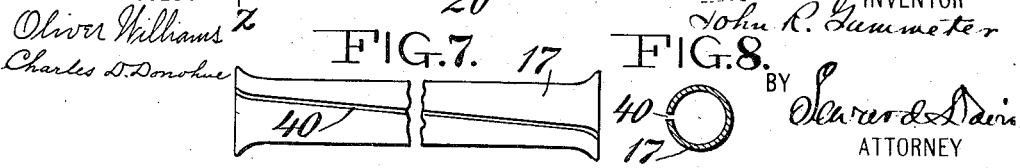
WITNESSES:
Oliver Williams
Charles D. Donohue
INVENTOR
John R. Gammeter
BY
Howard & Davis
ATTORNEY

UNITED STATES PATENT OFFICE.

JOHN R. GAMMETER, OF AKRON, OHIO, ASSIGNOR TO THE B. F. GOODRICH COMPANY, OF AKRON, OHIO, A CORPORATION OF OHIO.

APPARATUS FOR VULCANIZING RUBBER.

No. 906,215.     Specification of Letters Patent.     Patented Dec. 8, 1908.

Application filed May 20, 1907. Serial No. 374,686.

*To all whom it may concern:*

Be it known that I, JOHN R. GAMMETER, a citizen of the United States of America, residing at the city of Akron, county of Summit, and State of Ohio, have invented certain new and useful Improvements in Apparatus for Vulcanizing Rubber, (Case C,) of which the following is a specification.

My invention relates to improved apparatus for vulcanizing articles of rubber whereby vulcanization may be carried on as a continuous process.

It particularly relates to means for curing or vulcanizing hose, tubing, solid or hollow rubber tires, and the like articles of rubber, without coiling, in any desired lengths, by means of a novel endless steam jacketed wire channel, or mold conveyer, and means for causing the same to travel continuously through the said steam jacket whereby vulcanization is effected in transit.

My invention has for its objects the provision of an apparatus whereby hose or the like may be continuously produced in unlimited lengths and may be cured or vulcanized while straight so that the finished product will have no tendency to coil or kink.

A further object of my invention is the production of hose and the like of great durability at less cost of material and manufacture than that resulting from any prior process.

The manufacture of hose as at present practiced is subject to alternative disadvantages. If the hose is to be cured in straight lengths, only comparatively short lengths can be produced through the limitations imposed by the depth of practicable vulcanizing chambers. If greater lengths be desired, the uncured hose must be coiled during vulcanization. After the vulcanization, hose thus cured has a tendency to coil and is not homogeneous. When in use, one side is compressed beyond normal and the opposite is stretched beyond normal. The side with longer radius in the coil being under tension of compression while the opposite side being under tension of stretch, any tendency to weakness or inherent flaw in the latter side is magnified and developed. The hose made by my process will always lie normally straight and the corrugations upon its exterior surface formed by the wire mold serve to protect it from wear to such an extent that less rubber is required for this outer jacket. I attain these objects by the method hereinafter set forth which may be practiced by the apparatus disclosed in the accompanying drawings forming part of this specification.

I do not claim the novel method herein disclosed in this case, as I have made it the subject of a divisional application, Serial No. 379,831 filed the 20th day of June, 1907.

In the drawings Figure 1 is a plan view of a set of three vulcanizers showing endless conveyers and the means for causing their continuous travel therethrough. Fig. 2 shows an elevation of the apparatus illustrated in Fig. 1. Fig. 3 is an end view in elevation of this apparatus. Fig. 4 is a detail sectional view showing the endless wire bands constituting a combined mold and conveyer. Fig. 5 is a transverse sectional view of the parted steam jacket and mold on the line $x$—$x$ of Fig. 2. Fig. 6 is a section of same at right angles on the line $z$—$z$ of Fig. 5. Figs. 7 and 8 are an elevation and transverse section respectively of the guide tube.

Like reference numerals throughout the several figures indicate the same parts.

1 is the uncured hose, 2 a channel composed of two endless wire bands 3 and 4 formed into a circle as they enter the flared mouth of the channel pipe or guide tube 17, which runs through the vulcanizer intermediate the jackets 18 and 20 formed within which are steam chambers 19 and 21, respectively. The wire bands 3 and 4 are similarly formed. For example, the upper band 3 is made by passing a single wire through the tube 17, around the drum 32, back to the drum 5 and around it, and again through the tube a sufficient number of times until its parallel strands form a semi-circular arch in the tube; its ends are then united and brazed together. A number of separate parallel endless wires may be used to form the band if desired. The lower band 4 is made in the same manner around its corresponding set of lower drums, 6 and 34. These two separate endless bands of parallel wires, each of a plurality of turns, constitute both a mold and mold conveyer, forming a complete circular channel of wires when passing through the tube 17. The drums 5 and 6 are idler sheaves mounted upon the shaft 26, which is made adjustable by the screws 28 in the supports 27 in which it is journaled, so that the tension of the wire bands composing the endless mold may be suitably adjusted. These bands are shown as broken away in Fig. 1 on the drums 5 and 32, to permit a view of the underlying parts. 32 are the pulling sheaves to which suitable power is applied through a train of gears. A suitable source of power, herein shown as the motor 16, turns a shaft 15 carrying a worm 14, meshing with the cogs of the gear wheel 13 on the driving shaft bearing the pinion 12, which meshes in turn with the spur wheel 11 of the driving shaft 10; bearing the pinions 9, these meshing with the spur wheels 7, whose projecting rims form the sheaves or drums 32 carrying the belt 3. The spur wheel 7 meshes with the spur wheel 8, the extension of whose rim forms the drum or sheave carrying the belt 4, transmitting motion thereby to the idler sheave 6. Application of suitable power thus enables the belts 3 and 4 to be moved at an equal and controlled rate of speed, so that the travel of each half of the mold between the steam jackets 18 and 20 is at a predetermined, equal and constant speed. The steam jacket comprises the cast iron sections 18 and 20, formed within which respectively, are the steam chambers 19 and 21. The two sections 18 and 20 are fitted and bolted together as shown, each chamber having a suitable steam connection 22 and 23, Fig. 2. The steam passes, in case of a series of vulcanizers as here illustrated, into one of the vulcanizers as at 22, through its length and therefrom by the pipe 23 to the next, then through it, and from it by the pipe 24 to the next, thence returning by the pipe 25, so that the circulation of steam may be maintained through the series, as illustrated by Fig. 1. The lower chambers are similarly fitted with corresponding steam connections. It is often preferable however to run a header transversely of the chambers and connect each chamber with it.

The method of vulcanization with, and of operation of, my apparatus, in the curing, for example, of rubber hose, which is here chosen for illustration, is as follows: A tube of unvulcanized rubber having been formed in the usual manner in a tubing machine, and one or more plies of fabric having been braided or woven over the tube by a circular loom or otherwise, and a coating of unvulcanized gum or rubber having been placed over this braided or woven jacket by an insulating die in the usual manner, and this process having been continued until the number of desired plies of alternate fabric and gum have been built up, one end of the hose as thus formed is, initially, introduced from a reel or other suitable carrying mechanism, between the endless wire bands as they leave the idler sheaves 5 and 6, as shown in Fig. 4. It will be understood that these bands serve not only as a mold but also as a conveyer, drawing one end of the hose through the vulcanizer, so that the hose does not slip along the wires but that the wires and the hose travel together inside of the stationary tube 17. Before this free end 31 enters between the endless bands, it is plugged. The other end of the hose upon the feed reel is connected to a source of air supply under pressure shown diagrammatically in this instance as the pipe 30 connected to a source of air pressure, controlled by the valve 29. Compressed air or other compressible medium, as gas, liquid or steam, is then admitted to the hose throughout its length. In practice I have found that air maintained at the pressure of about fifty pounds to the square inch secures the best results. The uncured hose being formed of the approximate diameter of the endless wire mold, the hose when expanded by inflation before it enters the mold, becomes of somewhat greater diameter and is compressed by the mold upon its entry into the funnel mouth of the tube running through the vulcanizer, thus making it more compact before vulcanization. Steam having been admitted to the steam chambers until they are at the proper temperature for vulcanizing, the apparatus is ready for continuous operation and power may now be applied to the driving drums to convey hose through the vulcanizer at a constant rate predetermined in accordance with the quantity and quality of the rubber compound to be cured. As the hose passes in at one end it gradually becomes heated, the absorbed heat increases with its travel until it attains the temperature requisite for vulcanization at which it remains throughout the balance of its passage, issuing in due course as a finished product. By my method it is thus possible to cure hose of practically unlimited lengths in one piece, by uninterrupted and continuous operation. Any length may be made by splicing the forward end of an uncured length to the rear end of its predecessor in the vulcanizer. The only interruption to the continuity of the process in the latter case is for the purpose of splicing, which can readily be effected by those skilled in the art, the inflation tap being applied at the rear end of such new section. It is to be understood however that each of these sections may be several thousand feet in length if desired, so that it is possible to produce hose of great length without splicing and without interruption of the continuous process of vulcanization, while by splicing, continuous and unlimited lengths may be produced.

It is obvious that the diameter of the curing tube may be varied to adapt it to the desired diameter of the hose to be made and that the number of turns of wire upon the endless bands together forming the circular wire mold will be varied correspondingly. Similarly the rate of travel of the mold will vary in correspondence with the quantity of rubber to be cured, or the thickness of the wall of the hose or tube, and the temperature of the steam chamber will be varied in accordance with the nature of the compound or the amount of material undergoing treatment, likewise the internal pressure, the nature of the inflating medium and the tension of the endless mold will be varied in correspondence with the varied conditions of the stock to be cured.

It will also be apparent to those skilled in the art that the details of construction of the machine may be altered without departing from the spirit of my invention. For example the steam chamber may be formed by a single, concentric jacket around the tube which forms a guide for the endless wire mold; or other means as hot air, hot water or electricity may be used to heat the mold; power may be applied to the driving sheaves in any approved manner; and the form of the endless mold may be varied by substituting for the wire belt a metal belt or strap which may be of irregular cross section conforming to the configuration or shape of the article to be produced, the guide tube through which the traveling mold passes being adapted to correspond thereto. Any desired number of belts may be used to form the traveling mold.

My apparatus is alike applicable as has been noted, to the curing of solid rubber stock where it is desired to produce unlimited lengths of homogeneous vulcanized compounds, as solid tires or belting. It is likewise within the spirit of my invention to employ the endless wire channel solely as a conveyer for a separate mold carried within and by it. These specific constructions I reserve the right to make the subject matter of separate applications.

I have illustrated a construction whereby the number of wires forming the traveling mold may be conveniently varied. In order to accomplish this without cutting the endless wire belt I provide auxiliary channels 35 which may be formed in the walls of the vulcanizing chamber as shown in Fig. 5, one channel for the surplus wires of the upper belt and the other for the surplus wires of the lower belt. To get the wires into and out of the tube 17 I form in the wall of the tube a spiral slot 40 as shown in Figs. 7 and 8. This slot usually makes about one-fourth of a turn in the length of the tube.

In operation it is found that the inner surface of the tube 17 wears away, thus enlarging its diameter and allowing the wire strands to spread apart. In order to keep the tube completely lined with the wires, an additional wire must be from time to time inserted and this is done by means of the above described devices as follows: The parts of the vulcanizing chamber are separated, the wires slackened, and one or more wires are taken out of one of the channels 35 and passed through the slot 40 into the guide tube. The vulcanizing chamber is then put together again, the wires tightened, and the apparatus is ready for operation. In like manner if it is desired to vulcanize hose or other articles of a different diameter, the parts of the vulcanizing chamber can be separated, the wires all taken out through the slot 40, the tube 17 removed, and another tube of the same external diameter but of a different internal diameter put in its place. A sufficient number of wires to line this tube are then inserted through its slot 40 and the parts adjusted for operation.

Having thus described my invention I claim:

1. In an apparatus of the character described, the combination with a vulcanizing chamber of an endless wire mold adapted to continuously travel therethrough.

2. In an apparatus of the character described, the combination with a vulcanizing chamber of an endless wire mold adapted to travel continuously therethrough, and means for controlling the rate of travel.

3. In apparatus of the character described, the combination with a vulcanizing chamber of an endless wire mold adapted to travel continuously therethrough, means for controlling the rate of travel, and means for controlling the tension of said wire mold.

4. In apparatus of the character described, the combination of a vulcanizing chamber, a channel therethrough, and an endless wire mold passing through said channel and forming a conveyer.

5. In apparatus of the character described, the combination of a vulcanizing chamber, an endless wire mold adapted to travel continuously therethrough, said mold comprising a plurality of bands, each composed of a plurality of parallel strands of wire.

6. In apparatus of the character described, the combination of a vulcanizing chamber, an endless wire mold adapted to travel continuously therethrough, said mold comprising a plurality of bands, each composed of a plurality of strands of an endless wire, and means for controlling the rate of passage of said bands through said chamber and means for causing their travel therethrough at the same rate.

7. In an apparatus of the character described, the combination with a vulcanizing chamber, of a continuous channel therethrough, a plurality of pulling drums at one end of said channel, a plurality of idler drums at the other end of said channel, a plurality of endless wires, each passing around one pair of pulling and idler drums and through said channel such number of times that when combined in the said channel they form a cylindrical jacket of parallel wires.

8. In an apparatus of the character described, the combination with a vulcanizing chamber, of a continuous channel therethrough, a plurality of pulling drums at one end of said channel, a plurality of idler drums at the other end of said channel, a plurality of endless wires, each passing around one pair of pulling and idler drums and through said channel such number of times that when combined in the said channel they form a cylindrical jacket of parallel wires, and means for causing the timed rotation of said pulling drums at equal speed.

9. In an apparatus of the character described, the combination with a vulcanizing chamber, of a continuous channel therethrough, a plurality of pulling drums at one end of said channel, a plurality of idler drums at the other end of said channel, a plurality of endless wires, each passing around one pair of pulling and idler drums and through said channel such number of times that when combined in the said channel they form a cylinder of parallel wires, means for causing the timed rotation of said pulling drums at equal speed, and means for heating said vulcanizing chamber.

10. In an apparatus of the character described, the combination with a vulcanizing chamber, of a continuous channel therethrough, a plurality of pulling drums at one end of said channel, a plurality of idler drums at the other end of said channel, a plurality of endless wires, each passing around one set of pulling and idler drums and through said channel such number of times that when combined in the said channel they form a cylinder of parallel wires, means for causing the timed rotation of said pulling drums at equal speed, means for heating said vulcanizing chamber, and means for adjusting the tension of said wires.

11. In an apparatus for vulcanizing an article of substantially unlimited length; a vulcanizing chamber through which the article moves, traveling belts by which the article is compressed and wholly supported during its travel through the chamber, and means for supporting the belts.

12. The combination of a vulcanizing chamber with a mold passing therethrough formed of an endless traveling belt and a guide for transversely cupping said belt.

13. In a vulcanizer for rubber articles of great length, means progressively forming a mold about the rubber stock to compress the same, and to cause it to travel continuously during vulcanization in a substantially straight path, and means for vulcanizing said stock during its travel.

14. In a vulcanizing apparatus, the combination with a vulcanizer of an endless traveling mold composed of a plurality of elements, which, during that portion of their travel wherein they are in contact with the molded article, travel in straight and parallel paths.

15. In vulcanizing apparatus, the combination with a vulcanizer of an elongated mold, the walls of which are formed of longitudinally disposed traveling belts, the adjacent edges of the wall-forming runs of the belts being parallel and substantially contiguous, whereby the belts form a substantially closed tube.

16. In an apparatus of the character described, the combination with a vulcanizing chamber of means for compressing expanded rubber tubing upon its entry therein and of conveying said tubing therethrough in continuous travel while under pressure, and means for vulcanizing said tubing during said travel.

17. In an apparatus of the character described, the combination with a vulcanizing chamber of means for compressing expanded rubber tubing upon its entry therein and of conveying said tubing therethrough in continuous travel while under pressure, and means for vulcanizing said tubing during said travel and means for controlling the rate and degree of said vulcanization.

18. In an apparatus of the character described, the combination with a plurality of vulcanizing chambers of means for compressing expanded rubber tubing upon its entry therein and of conveying said tubing therethrough in continuous travel while under pressure, and means for vulcanizing said tubing during said travel.

19. In an apparatus of the character described, the combination with a plurality of vulcanizing chambers of means for compressing expanded rubber tubing upon its entry therein and of conveying said tubing therethrough in continuous travel while under pressure, and means for vulcanizing said tubing during said travel and means for controlling the rate and degree of said vulcanization.

20. In an apparatus of the character described, the combination with a vulcanizing chamber of an endless wire mold adapted to continuously travel therethrough and means for varying the size of the mold.

21. In an apparatus of the character described, the combination with a vulcanizing chamber of an endless wire mold adapted to travel continuously therethrough, means for controlling the tension of said wire mold and means for varying its size.

22. In an apparatus of .the character described, the combination with a vulcanizing chamber of a channel therethrough, means for varying the size of said channel, an endless wire mold passing through said channel and means for varying the number of wires forming said mold.

23. In apparatus of the character described, the combination of a vulcanizing chamber, an endless wire mold adapted to travel continuously therethrough, said mold comprising a plurality of bands each composed of a plurality of parallel strands of wire, and means for varying the number of strands in each band.

24. In an apparatus of the character described, the combination with a vulcanizing chamber, of a continuous channel therethrough, a plurality of pulling drums at one end of said channel, a plurality of idler drums at the other end of said channel, a plurality of endless wires, each passing around one pair of pulling and idler drums and through said channel such number of times that when combined in the said channel they form a cylinder of parallel wires, means for causing the rotation of said pulling drums at equal speed, means for varying the internal diameter of said channel, means for introducing a greater or less number of wires into said channel and means for heating said vulcanizing chamber.

25. In an apparatus of the character described, the combination with a vulcanizing chamber, of a channel therethrough, a guide tube passing through said channel, an endless wire band formed of a plurality of strands of wire passing through said tube and means for introducing the strands into or removing them from the tube without parting the strands.

26. In an apparatus of the character described, the combination with a vulcanizing chamber, of a channel therethrough, a guide tube passing through said channel said tube being provided with a longitudinal slot extending from end to end thereof, and an endless wire band formed of a plurality of strands of wire, passing through said tube.

27. In an apparatus of the character described, the combination with a vulcanizing chamber, of a channel therethrough a guide tube passing through said channel, said tube being provided with a spiral slot extending from end to end thereof, an auxiliary channel, and an endless wire band formed of a plurality of strands of wire passing through said tube, the parts being constructed so that said strands may be removed from said tube through the spiral slot and into the auxiliary channel and vice versa.

28. In vulcanizing apparatus, a tubular mold formed of a plurality of wires.

29. In vulcanizing apparatus, an elongated substantially straight mold comprising a traveling mold-forming belt and means for shaping said belt to form the mold.

30. A mold formed of a plurality of endless traveling strands of wire.

31. In vulcanizing apparatus, the combination with a vulcanizer of a mold, all the molding surface of which is formed of endless traveling belting.

32. In vulcanizing apparatus a mold formed of an endless traveling belt and a guide for transversely cupping said belt to give the molding surface the desired shape.

33. A mold formed of a plurality of endless traveling belts each comprising a plurality of strands of wire and a guide tube through which said belts pass.

34. In combination with a vulcanizer a mold formed of an endless traveling belt and means for varying the size of the mold.

35. A mold formed of a plurality of endless traveling strands of wire, a guide tube through which said strands pass and means for introducing them into and removing them from said tube without parting the wire.

36. A mold formed of a plurality of endless traveling strands of wire, and a longitudinally slotted guide tube through which said strands pass.

37. In apparatus for vulcanizing tubing, the combination with a vulcanizing chamber of means for expanding the tubing, and means for compressing the tubing upon its entry into the chamber and for conveying it therethrough in continuous travel while under pressure.

38. In apparatus for vulcanizing tubing, the combination with a vulcanizing chamber of means for filling the tubing with fluid under pressure, and means for compressing the tubing upon its entry into the chamber and for conveying it therethrough in continuous travel while under pressure.

39. In apparatus for vulcanizing tubing, the combination with a vulcanizing chamber of means for conveying the tubing therethrough in continuous travel and means for subjecting the walls of the tubing to compression upon the inner and outer faces thereof during such travel.

40. In apparatus for vulcanizing tubing the combination with a traveling vulcanizing mold adapted to contain tubing of means for filling the tubing with fluid under pressure.

41. In vulcanizing apparatus for articles of great length and substantially uniform cross-section, a vulcanizing chamber open at the ends and of similar but slightly larger cross-section than the article to be vulcanized, in combination with flexible traveling means adapted to lie between the walls of the chamber and the article and separate the latter from the former.

42. In vulcanizing apparatus for articles of great length and substantially uniform cross-section, a vulcanizing chamber open at the ends and of similar but slightly larger cross-section than the article to be vulcanized, in combination with means adapted to surround the article and be held in contact therewith by the walls of the chamber and to travel through the chamber at the same rate as the article.

43. In vulcanizing apparatus, a vulcanizing chamber, and a mold for the article to be vulcanized, traveling through said chamber and supported and guided by the interior walls thereof.

44. In vulcanizing apparatus, a vulcanizing chamber and a mold for the article to be vulcanized, traveling through said chamber, and supported, guided and contracted by the walls thereof, whereby it is caused to convey, compress and mold said article.

45. In vulcanizing apparatus, a vulcanizing chamber, a removable liner, forming an interior wall therefor, and a mold traveling through said chamber and supported and guided by said liner.

46. In vulcanizing apparatus, in combination, a vulcanizing chamber, and means for progressively forming a mold about the rubber stock before it enters the chamber, said means accompanying the rubber stock through the chamber and supporting it in a substantially straight line while in the chamber and progressively releasing the same upon upon its exit from the chamber.

47. In vulcanizing apparatus, the combination with a vulcanizer of a composite mold whose elements consist of endless traveling members, contacting laterally while in the vulcanizer.

48. The combination with a vulcanizing apparatus of a traveling wire tube and means for contracting it in diameter.

49. In vulcanizing apparatus, a mold consisting of a wire tube.

In witness whereof I have signed these specifications this fourteenth day of May, 1907.

JOHN R. GAMMETER.

In the presence of—
ARTHUR E. DAVIDSON,
WALTER K. MEANS.